United States Patent

Nagai et al.

[11] Patent Number: 5,949,025
[45] Date of Patent: *Sep. 7, 1999

[54] MULTIFUNCTIONAL CONDUIT

[75] Inventors: Shigekazu Nagai; Koji Sugano, both of Yawara-mura, Japan

[73] Assignee: SMC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/718,185

[22] Filed: Sep. 19, 1996

[30] Foreign Application Priority Data

Oct. 3, 1995 [JP] Japan .................................. 7-279677

[51] Int. Cl.$^6$ ...................................................... H02G 3/00
[52] U.S. Cl. .......................................... 174/101; 439/207
[58] Field of Search .............................. 174/101, 48, 49, 174/97, 100, 68.3; 439/207, 212

[56] References Cited

U.S. PATENT DOCUMENTS

| | | | |
|---|---|---|---|
| 3,554,236 | 1/1971 | Rhodes | 138/117 |
| 3,761,603 | 9/1973 | Hays et al. | 174/101 |
| 3,821,688 | 6/1974 | Larsile . | |
| 4,166,195 | 8/1979 | Schwab | 174/95 |
| 4,270,835 | 6/1981 | Kordt et al. | 339/198 |
| 4,857,670 | 8/1989 | Frank et al. | 174/68.3 |
| 4,907,767 | 3/1990 | Corsi et al. | 248/49 |
| 4,942,271 | 7/1990 | Corsi et al. | 174/101 |

FOREIGN PATENT DOCUMENTS

| | | |
|---|---|---|
| 0 200 927 | 11/1986 | European Pat. Off. . |
| 0 453 392 | 10/1991 | European Pat. Off. . |
| 4-119601 | 10/1992 | Japan . |
| 4-119603 | 10/1992 | Japan . |
| 4-128582 | 11/1992 | Japan . |
| 7-27113 | 1/1995 | Japan . |

*Primary Examiner*—Nestor Ramirez
*Assistant Examiner*—Joseph Waks
*Attorney, Agent, or Firm*—Oblon, Spivak, McClelland, Maier & Neustadt, P.C.

[57] ABSTRACT

The present invention relates to a multifunctional conduit acting as a structural member, an attaching member, and a conduit duct. A base of the conduit has the strength and rigidity required as the structural member, has on its bottom surface at least one fitting groove for interconnection with other members and on its top surface standerdized rails to which various devices can be attached, and has outside each wall of the rail an attachment section to which a cover is attached. Said cover has on each of its right and left sidewalls first engagement section which is engaged with the attachment section of the base and second engagement section which is engaged with the wall of the rail.

11 Claims, 5 Drawing Sheets

MULTIFUNCTIONAL CONDUIT

BACKGROUND OF THE INVENTION

1. Field of the Invention

The present invention relates to a multifunctional conduit, and in particular, to a multifunctional conduit acting as a structural member constituting a structure, an attaching member to which various fluid and electrical devices can be attached, and a conduit duct in which pipes and wires are accommodated.

2. Description of Prior Art

When connected to a fluid-pressure device or its controller mounted on a working structure, pipes and wires are conventionally accommodated and protected in a conduit.

Conventional conduits, however, only have a function for simply accommodating pipes and wires to protect them, so they cannot be incorporated into the structure or used to connect the above devices together. They can only be attached to the structure as simple accessories for piping and wiring. Consequently, such conduits are cumbersome to handle, and their attachment and removal operations are complicated.

BRIEF SUMMARY OF THE INVENTION

A main objective of this invention is to provide a multifunctional conduit that acts as a structural member constituting a structure, as an attaching member to which various fluid and electrical devices can be attached, and as a conduit duct in which pipes and wires are accommodated.

Another objective of this invention is to provide an easy-to-handle multifunctional conduit comprising a base and a cover that can be reliably and quickly attached to and removed from the base using simple operations.

To achieve the above objectives, this invention provides a conduit comprising a base and a cover. The base has the strength and rigidity required of a structural member, and also has in its bottom surface at least one fitting groove for interconnection with other members and on its top surface standardized rails to which fluid or electrical devices can be attached. It also has an attachment section to which the cover is attached. The cover has on its right and left sidewalls a first and second engagement section, which are engaged to the attachment section of the base and the walls of the rail, respectively.

In addition to its inherent function of accommodating pipes and wires, this conduit can function as a structural member by enabling the fitting groove to be used for connection to other members and also as a device-attachment member that enables the rails to be used to attach various devices to the conduit. In addition, due to the use of the first and second engagement sections, the cover can be reliably and firmly attached to the base. Since the rails to which devices can be attached can also be used to attach the cover to the base, the conduit has a simple and reasonable design structure.

According to a preferred embodiment of this invention, the cover is partitioned into right and left sidewalls and a roof, and the right and left sidewalls each include the first and second engagement sections.

According to a specific embodiment of this invention, the attachment section is a groove with an arcuate cross section, and the first engagement section also has an arcuate cross section. By fitting the arcuate engagement section in the arcuate groove, the right and left sidewalls can be attached to the base from the direction of its side. In addition, the second engagement section has a hook-like portion, and is engaged with the walls of the rail by installing the sidewalls.

According to this invention, the rail preferably conforms to the DIN standard and includes on the top ends of the pair of its walls an edge that extends outward from the base in the direction of the width of the base.

According to another embodiment of this invention, the base of the conduit has an inner rail with a smaller gap between its opposite walls and an outer rail with a larger gap between its opposite walls, and has inner and outer attachment sections outside each wall of the inner and outer rails, respectively.

The cover, however, has at least either the right and left inner walls that can be engaged with and removed from the inner attachment section and the inner rail, or the right and left outer walls that can be engaged with and removed from the outer attachment section and the outer rail.

DETAILED DESCRIPTION OF THE PREFERRED EMBODIMENT

FIGS. 1 to 4 show the first embodiment of a multifunctional conduit according to this invention. Conduit 1A comprises a base 2A and a cover 3A detachably mounted on the top surface of the base 2A with a space 4 between the base 2A and the cover 3A in which pipes and wires are accommodated.

Base 2A comprises an extrusion-molded member with a specified cross section which is obtained by extrusion-molding a raw metallic material such as aluminum or its alloy which has the strength and rigidity required of a structural member.

Figure 8:
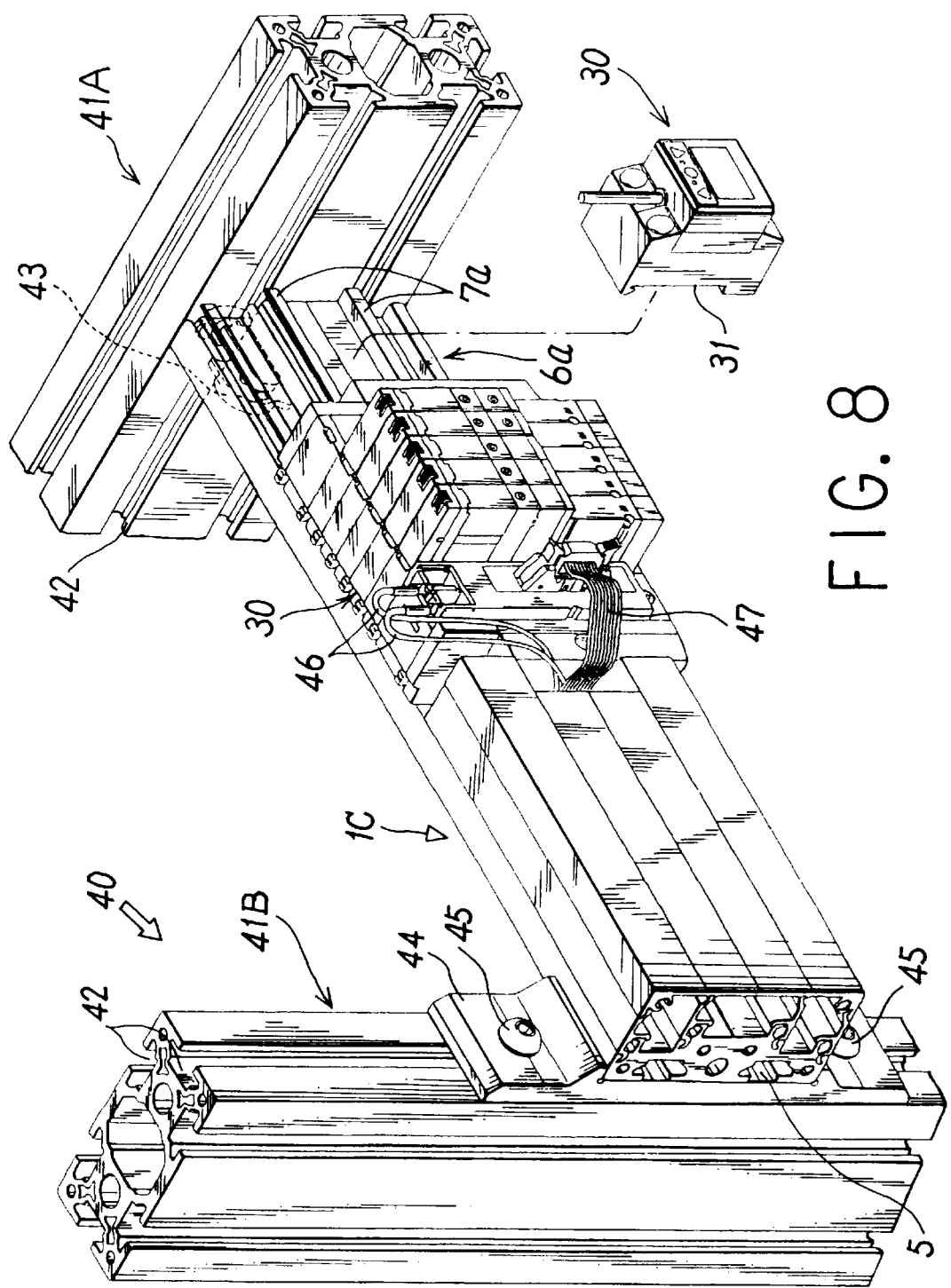
FIG. 8 is a perspectival view showing the conduit according to this invention in use.

At least one fitting groove 5 is longitudinally formed on the bottom surface of the base 2A for interconnection with other members. The fitting groove 5 has a small width at its opening and also an approximately T-shaped cross section. For example, the fitting groove 5 is coupled to another member 41A or 41B by engaging an appropriate connecting fixture 43 with the fitting groove 5 and a similar fitting groove 42 in the member 41A, or by securing a fixture engaged with the fitting groove 5 to a bracket 44 mounted on the member 41B using its fitting groove 42, respectively, as shown in FIG. 8. This allows the base 2A to act as a structural member that is incorporated into a structure 40.

Figure 6:
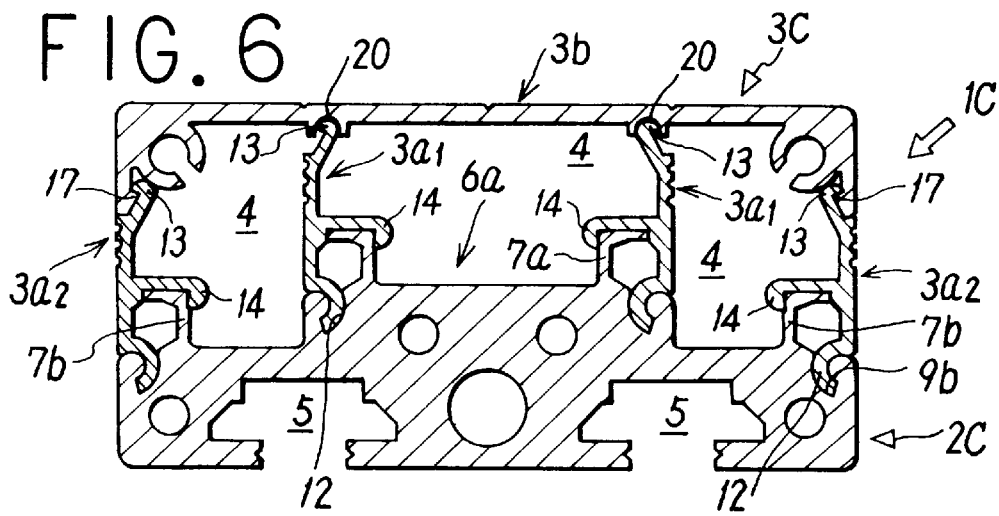
FIG. 6 is a cross-sectional view showing the third embodiment of this invention.

FIG. 8 typically shows an example of the usage of the conduit according to this invention with reference to a conduit 1C according to a third embodiment shown in FIG. 6. In this figure, 45 is a screw for fixing the bracket 44, 46 is a pressure fluid piping, and 47 is electrical wiring.

A detailed example of a connection method using connecting fixture 43 is shown in, for example, Japanese Patent Application No. H 5-168235.

Figure 4:
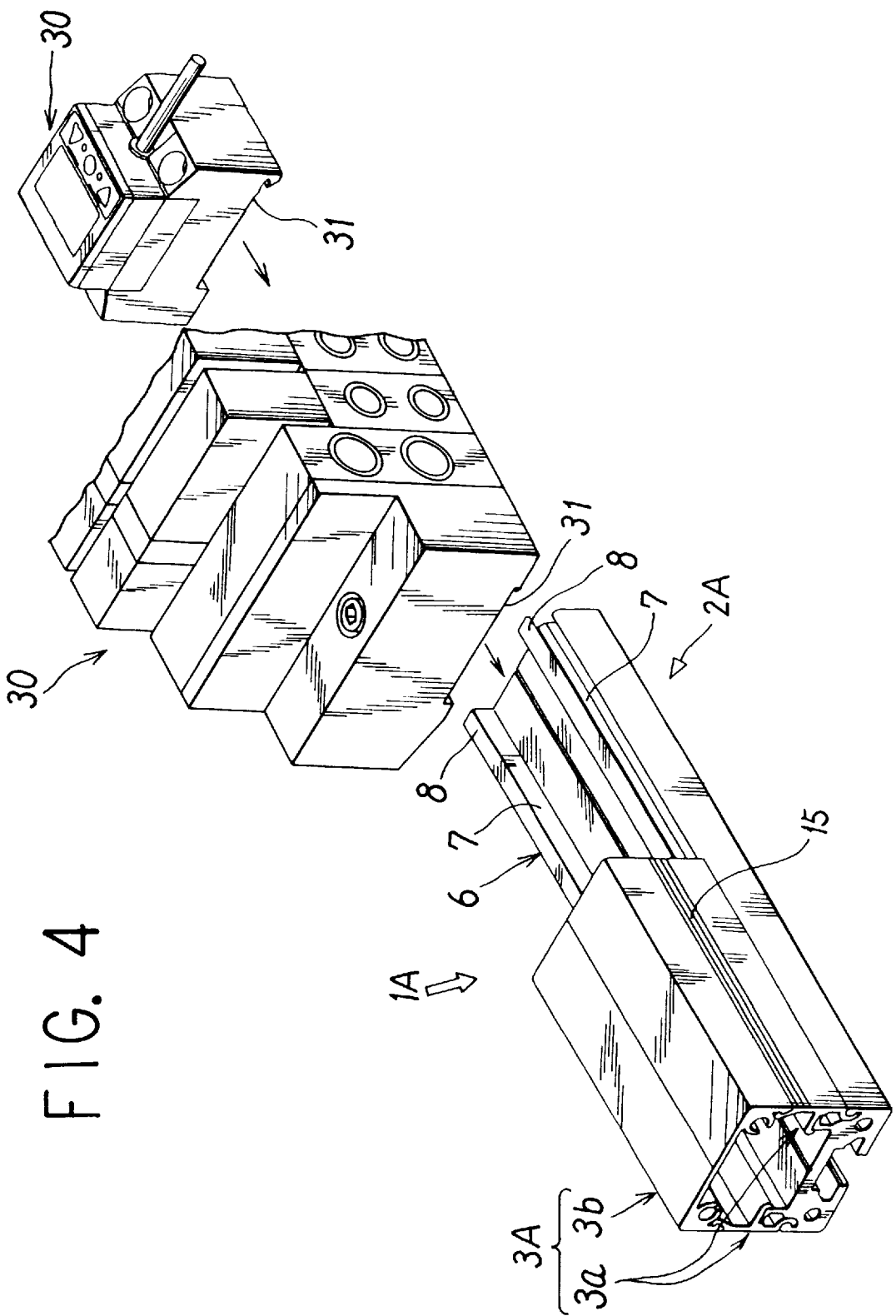
FIG. 4 is a perspectival view showing a method for attaching devices to the conduit in FIG. 1.

On its top surface, the base 2A has a rail 6 that extends longitudinally, comprising a lateral pair of walls 7, 7 that extend upward, and to which various fluid and electrical devices such as solenoid valves and their controllers can be attached. The rail 6 includes at the top end of each of its walls 7 a portion 8 that extends outward and horizontally in the direction of the width of the base 2A, and conforms to the DIN standard. A device 30 can be attached to the rail 6 by engaging engagement grooves 31 formed in the device 30 with the rail 6, as shown in FIGS. 4 and 8.

Methods for installing devices using rail 6 are well-known techniques as disclosed in Japanese Utility Model Laid Open No. H 4-119601, Japanese Utility Model Laid Open No. H 4-119603, and Japanese Utility Model Laid Open No. H 4-128582, and will not be further referred to.

Furthermore, on the base 2A, attachment sections 9, 9 to which the cover 3A is attached is formed outside each of the walls 7, 7 of the rail 6. The attachment section 9 is a groove that has an arcuate cross section bending inwardly in the direction of the width and which is cut down to a specified depth from the top surface of the base 2A.

Cover 3A comprises right and left sidewalls 3a, 3a of rigid or semi-rigid synthetic resin and a roof 3b of rigid or semi-rigid synthetic resin which extends across the sidewalls 3a, 3a. When these components are connected together, the cover 3A has a groove-like cross section.

The right and left sidewalls 3a, 3a have at their bottom end a first engagement section 12 that is engaged with the attachment section 9 of the base 2A and on its inner surface a second engagement section 14 that is engaged with the wall 7 of the rail 6. They also have at their top end a locking section 13 that is internally and elastically engaged with the locking section 17 of the roof 3b.

Figure 3:
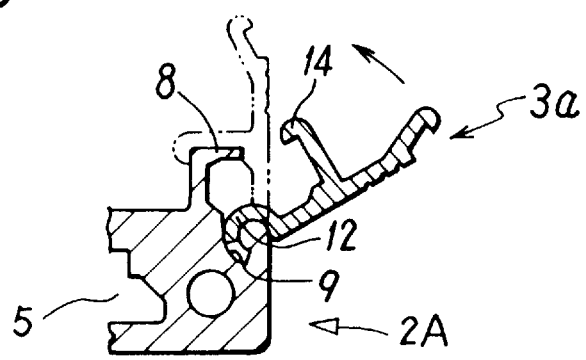
FIG. 3 is an enlarged view of the integral part of FIG. 2.

The first engagement section 12 has a similar arcuate cross section to that of the attachment section 9, and fitting together the first engagement section 12 and the attachment section 9 enables the sidewalls 3a, 3a to be manually and simply installed from the direction of the side of the base 2A, as shown in FIG. 3.

The second engagement section 14 comprises a hook-like portion that bends downward from the end of a wall 14a extending transversely from the sidewall 3a. By attaching the sidewall 3a to the base 2A, the hook-like portion is elastically engaged with the top end of the wall 7 of the rail 6, as shown in FIG. 3.

Thus, the sidewalls 3a, 3a can be reliably and firmly attached to the base 2A using the first and second engagement sections 12 and 14. In addition, by installing the sidewalls 3a, 3a using the rail 6 to which the device 30 is attached, the conduit 1A can be given a simple and reasonable design structure.

Reference numeral 15 in the figure designates an antislip section comprising a plurality of shallow grooves cut longitudinally in the outer surface of the sidewalls 3a, 3a, and 18 is an attachment hole in which a screw is inserted to connect the bases 2A or the covers 3A to each other. The hole wall around the attachment hole 18 formed in the roof 3b constitutes the locking section 17 that engages the engagement section 13 of the sidewall 3a.

Figure 1:
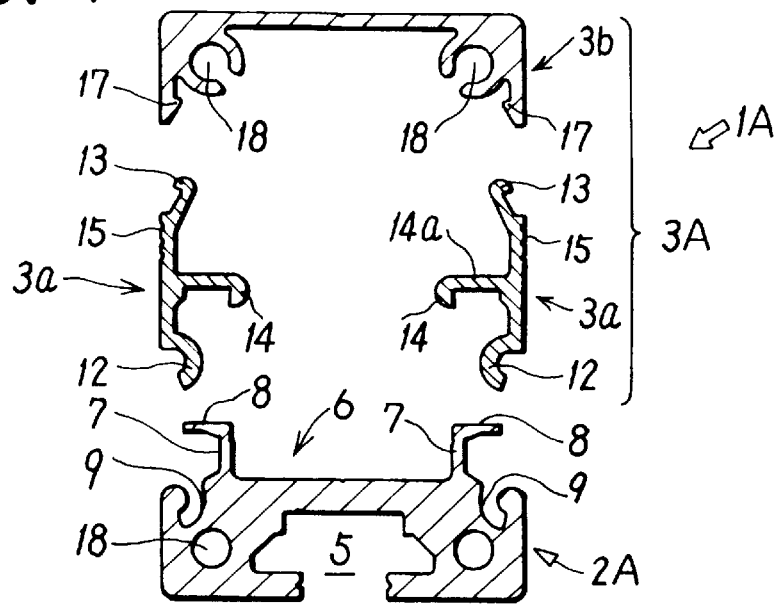
FIG. 1 is a cross-sectional view of the first embodiment of a disassembled multifunctional conduit according to this invention.
Figure 2:
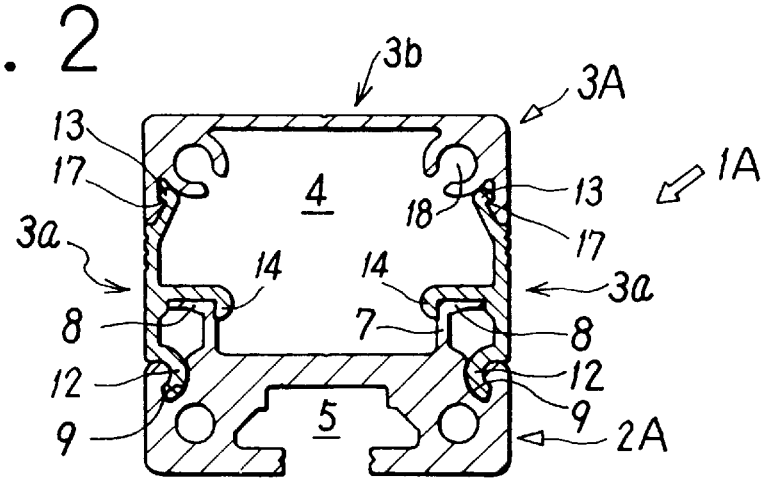
FIG. 2 is a cross-sectional view of the assembled conduit in FIG. 1.

In the conduit 1A according to the above embodiment, when the cover 3A is installed on the base 2A, the first arcuate engagement section 12 at the bottom end of the sidewall 3a is first inserted from the side of the base 2A into the attachment section 9 that is an arcuate groove, as shown by the solid line in FIG. 3, and the sidewall 3a is then allowed to stand, as shown by the broken line. Then, as also shown in FIG. 2, the first engagement section 12 of the sidewall 3a is completely engaged with the attachment section 9, while the second engagement section 14 is engaged with the top end of the wall 7 of the rail 6, thereby allowing the sidewall 3a to be attached to the base 2A. Pipes and wires are then accommodated between the right and left sidewalls 3a, 3a. The roof 3b is then contacted with the top ends of both the sidewalls 3a, 3a and pressed downward to elastically engage the locking sections 13 and 17 together. The roof 3b is thus attached to the sidewalls to finish the installation of the cover 3A.

When conduit 1A is opened for maintenance, the roof 3b can be removed by inwardly pressing the top ends of the right and left sidewalls 3a, 3a to release the engagement of the locking sections 13 and 17. When required, the sidewalls 3a, 3a can also be removed using an operation that reverses their installation.

If the device 30 is attached to the base 2A, as shown in FIG. 4, the cover 3A is cut into pieces of required lengths, which are then installed over areas other than the one to which the device 30 is attached. In this case, since the cover 3A is made of synthetic resin, it can be cut easily, and draw-out holes for drawing out pipes and wires can be drilled easily.

Thus, in addition to a function as a conduit duct in which pipes and wires are accommodated, the conduit 1A acts as a structural member constituting a structure and as an attaching member to which various fluid and electrical devices can be attached.

Figure 5:
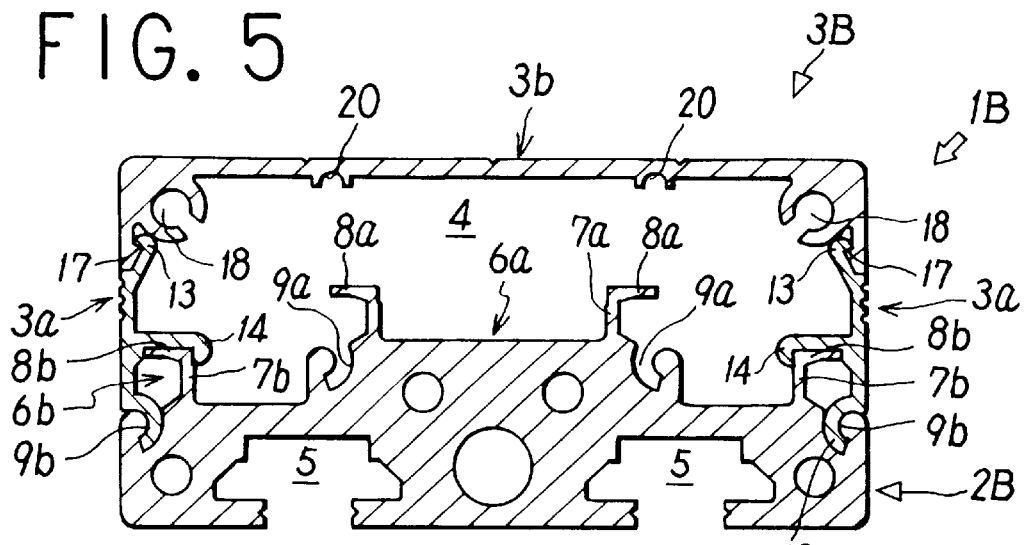
FIG. 5 is a cross-sectional view showing the second embodiment of this invention.

FIG. 5 shows a second embodiment of this invention. A conduit 1B according to the second embodiment also has a base 2B and a cover 3B, which together have the following configuration.

The base 2B has on its bottom surface two fitting grooves 5, 5 and on its top surface an inner rail 6a comprising a lateral pair of walls 7a, 7a and an outer rail 6b comprising a lateral pair of walls 7b, 7b with a larger gap between them than exists between the walls 6a. The base 2B also has outside each wall 7a of the inner rail 6a and each wall 7b of the outer rail 6b, inner and outer attachment sections 9a and 9b to which the cover 3B is attached, respectively. The inner rail 6a and the inner attachment section 9a are formed higher than the outer rail 6b and the outer attachment section 9b.

The inner rail 6a is used to install the device 30, and includes at the top ends of the pair of its walls 7a, 7a edges 8a, 8a that extend outwardly and horizontally in the direction of the width of the base 2A and which conform to the DIN standard. The outer rail 6b includes similar extending edges 8b, 8b at the top ends of the pair of its walls 7b, 7b, but does not conform to the DIN standard and is mainly used to install the cover 3B. Of course, the outer rail 6b can be used to install the device.

The cover 3B substantially has the same constitution as the cover 3A according to the first embodiment except for its large width corresponding to the base 2B of a larger width and the presence of two recessed portions 20 in the inner surface of the roof 3b. The same major components thus have the same reference numerals as in the cover 3A according to the first embodiment, and their description is omitted. The functions of the recessed portion 20 will be apparent in the following description of the third embodiment.

FIG. 6 shows the third embodiment that differs from the second embodiment in that in the conduit 1C according to the third embodiment, a cover 3C has both inner sidewalls 3a1, 3a1 and outer sidewalls 3a2, 3a2.

The inner sidewalls 3a1, 3a1 include the first engagement section 12 engaged with the inner attachment section 9a of a base 2C, the second engagement section 14 engaged with the walls 7a, 7a of the inner rail 6a, and the locking section 13 at their top end which is engaged with a recessed portion 20 in the bottom surface of the roof 3b. The outer sidewalls 3a2, 3a2 include the first engagement section 12 engaged with the outer attachment section 9b of the base 2C, the second engagement section 14 engaged with the walls 7b, 7b of the outer rail 6b, and the locking section 13 at their top end which is engaged with the locking section 17 of the roof 3b.

This constitution allows three partitioned spaces 4 to be formed between the base 2C and the sidewalls 3a1, 3a2, so that pipes and wires can be accommodated individually in the spaces 4.

According to the third embodiment, since the difference in height between the inner attachment section 9a and inner rail 6a of the base 2C and the outer attachment section 9b and outer rail 6b thereof is equal to the difference in height between the locking section 17 and recessed portion 20 of the cover 3C, the inner sidewall 3a1 and the outer sidewall 3a2 may be the same. The roof 3b of the cover 3C is the same as the roof 3b of the cover 3C according to the second embodiment.

The third embodiment substantially has the same configuration as the second embodiment except that the cover 3C includes the double sidewalls as described above. The same major components thus have the same reference numerals as in the second embodiment, and their description is omitted.

Figure 7:
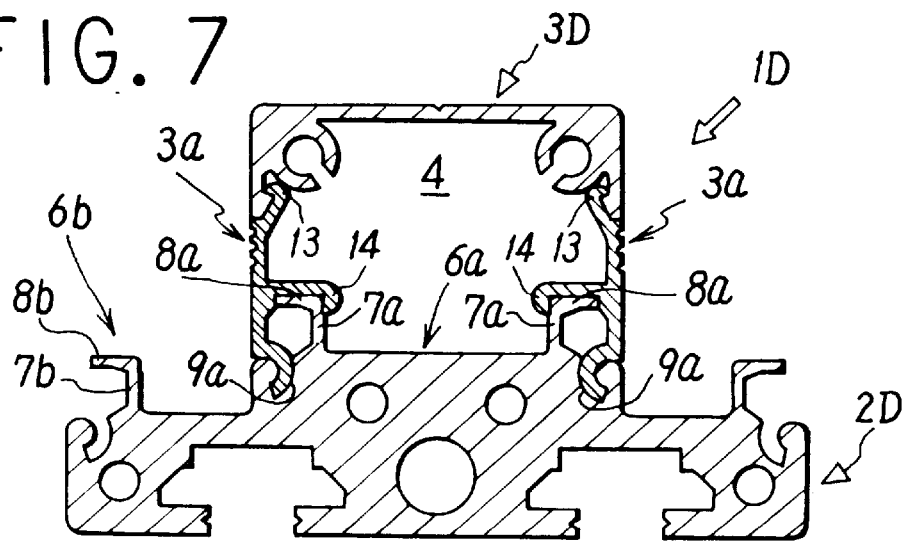
FIG. 7 is a cross-sectional view showing the fourth embodiment of this invention.

FIG. 7 is a fourth embodiment of this invention. A conduit ID according to the fourth embodiment is the same as the second embodiment except that a cover 3D is installed using the inner attachment section 9a and the inner rail 6a. The same major components thus have the same reference numerals as in the second embodiment, and their description is omitted.

Since in the fourth embodiment, the rail 6a conforms to the DIN standard, the cover 3A according to the first embodiment can be used as the cover 3D.

In the conduits 1B, 1C, and 1D shown in the second, third, and fourth embodiments, the bases 2B, 2C, and 2D have the same constitution, and the covers 3B, 3C, and 3D have different constitutions. Consequently, all the covers 3B, 3C, and 3D according to these embodiments can be used for a single base depending upon the type and position of the device 30 to be attached to the base.

Figure 9:
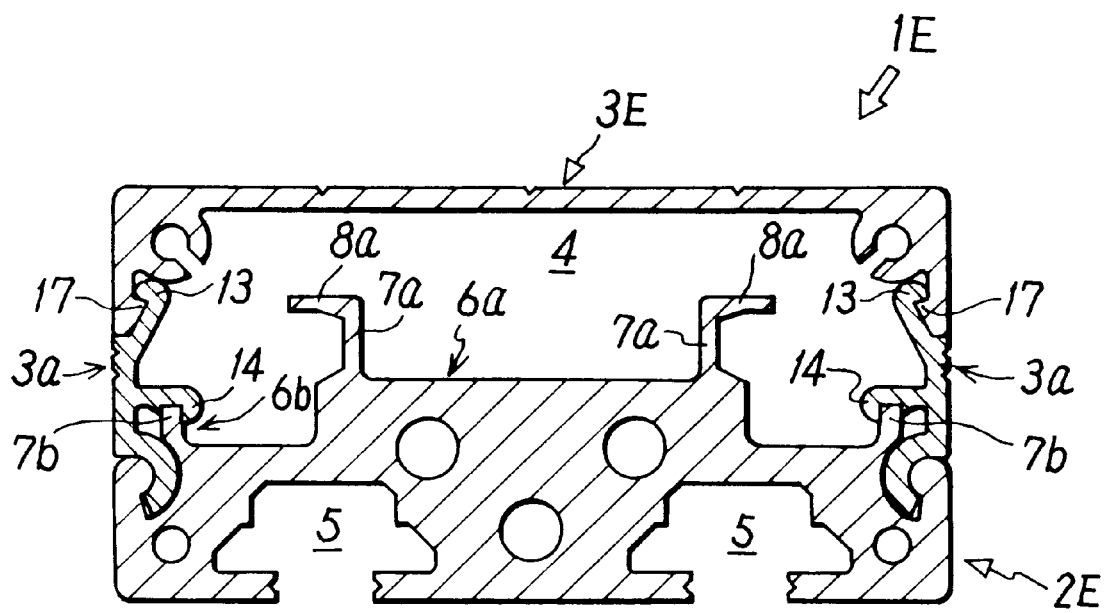
FIG. 9 is a cross-sectional view showing the fifth embodiment of this invention.

FIG. 9 shows a fifth embodiment of this invention. A conduit 1E according to the fifth embodiment is substantially the same as the second embodiment except that a base 2E does not have an inner attachment section, that the walls 7b, 7b of the outer rail 6b do not have an extending edge at their top end, that the roof 3b of a cover 3E does not have a recessed portion, and that the second engagement section 14 of the sidewalls 3a, 3a has a suitable shape for engagement with the walls 7b, 7b that do not have an extending edge. The same major components thus have the same reference numerals as in the second embodiment, and their description is omitted.

Although in the above embodiments, the cover is partitioned into the roof and right and left sidewalls, they may be integrated.

What is claimed is:

1. A multifunctional conduit comprising:

an extrusion molded base and a cover detachably mounted on a top surface of the base, said conduit having a space between the base and the cover in which pipes and wires are accommodated;

said base being a bi-laterally symmetrical structural member and having on a bottom surface at least one fitting groove for interconnection with other bases and on a top surface rails, each of which comprise a pair of walls which extend upward and to which various fluid and electrical devices can be attached, said base being strong and rigid to support said fluid and electrical devices, said base having outside each of said pair of walls of each of said rails an attachment section to which said cover is attached;

said cover being bi-laterally symmetrical and having a groove-like cross section and being partitioned into right and left sidewalls, each of said right and left sidewalls including an engagement section that is detachably engaged from a direction of a side of the base with the attachment section of said base and said each of said pair of walls of each of said rails, respectively, each of said right and left sidewalls having a locking section at a top end thereof, and having a roof attached to the right and left sidewalls by said locking section so as to extend there across, said locking section being released from said roof by pressing and bending the top end of the side wall inwardly.

2. A conduit according to claim 1, wherein said attachment section is a groove with an arcuate cross section while said engagement section has an arcuate portion, wherein by fitting the groove and the arcuate portion together, said right and left sidewalls can be installed from a direction of a side of the base, and wherein said second engagement section has a hook-like portion protruding from a side of the sidewall and is engaged with one of said pair of walls.

3. A conduit according to claim 1 or 2 wherein each of said rails includes at a top end of each of said pair of walls an edge extending outward in a width direction and conforms to the DIN standard.

4. A multifunlctional conduit comprising:

an extrusion molded base and a cover detachably mounted on a top surface of the base, said conduit having a space between the base and the cover in which pipes and wires are accommodated;

said base being a bi-laterally symmetrical structural member and having on a bottom surface at least one fitting groove for interconnection with other bases and on a top surface an inner rail which comprises a pair of walls that extend upward and to which various fluid and electrical devices can be attached, and an outer rail which comprises a pair of walls with a larger gap between them than that between the inner rail, said base being strong and rigid to support said fluid and electrical devices, said base having outside each of said pair of walls of the inner and outer rails inner and outer attachment sections to which said cover is attached said cover being bi-laterally symmetrical and having a groove-like cross section and being partitioned into right and left sidewalls, each including a first engagement section that is detachably engaged from a direction of a side of the base with either the inner or outer attachment section of said base and a second engagement section that is detachably engaged from a direction of a side of the base with the walls of either said inner or outer rail, each of said right and left side walls having a locking section at a top end thereof and having a roof attached to the sidewalls by said locking section so as to extend there across, said locking section being released from said roof by pressing and bending the top end of the side wall inwardly.

5. A conduit according to claim 4, wherein said attachment section if a groove with an arcuate cross section, while the first engagement section has an arcuate portion, wherein by fitting the groove and the arcuate portion together, said right and left sidewalls can be installed from a direction of a side of the base, and wherein said second engagement section has a hook-like portion protruding from a side of the sidewall and is engaged with on of said pair of walls.

6. A conduit according to 4 or 5, wherein said inner rail includes at a top end of each of said pair of walls an edge that extends outward in a width direction and conforms to the DIN standard, and wherein an extending edge similar to that of the inner rail is provided at a top end of each of said pair of walls of said outer rail.

7. A multifunctional conduit comprising:

an extrusion molded base and a cover detachably mounted on a top surface of the base, said conduit having a space between the base and the cover in which pipes and wires are accommodated;

said base being a bi-laterally symmetrical structural member and having on a bottom surface at least one fitting groove for interconnection with other bases and on a top surface an inner rail, which comprises a pair of inner walls which extend upward and to which various fluid and electrical devices can be attached, and an outer rail which comprises a pair of outer walls with a larger gap between them than between the inner rail, said base being strong and rigid to support said fluid and electrical devices, said base having outside each of said inner and outer walls of the inner and outer rails, inner and outer attachment sections to which said cover is attached;

said cover being bi-laterally symmetrical and being partitioned into right and left inner and outer sidewalls, each including first and second engagement sections that are detachably engaged from a direction of a side of the base with the outer attachment section and the pair of outer walls of the outer rail, respectively, and said right and left inner sidewalls, each including a first and second engagement section that are detachably engaged from a direction of a side of the base with the inner attachment section and the walls of the inner rail, respectively, each of said right and left side walls having a locking section at the top end thereof and having a roof attached to the sidewalls by said locking section so as to extend there across said locking section being released from said roof by pressing and bending the top end of the side wall inwardly.

8. A conduit according to claim 7 wherein said inner and outer attachment sections are grooves with a arcuate cross section, wherein the first engagement section in the inner and outer sidewalls has an portion, wherein by fitting the arcuate groove and the arcuate portion, each sidewall can be installed from a direction of a side of the base, and wherein said second engagement section has a hook-like portion protruding from an inner side of each side wall and is engaged with one of the pair of walls of said inner or outer rail.

9. A conduit according to claim 7 or 8 wherein said inner rail includes at a top end of each wall an edge that extends outward in the direction of a width of the base and conforms to the DIN standard, and wherein an extending edge similar to that of the inner rail is provided at a top end of each wall of said outer rail.

10. A multifunctional conduit comprising:

an extrusion molded base and a cover detachably mounted on a top surface of the base, said conduit having a space between the base and the cover in which pipes and wires are accommodated;

said base being a bi-laterally symmetrical structural member and having on a bottom surface at least one fitting groove for interconnection with other bases and on a top surface an inner rail, which comprises a pair of inner walls which extend upward and to which various fluid and electrical devices can be attached, and an outer rail which comprises a pair of outer walls with a larger gap between them than between the inner rail, said base being strong and rigid to support said fluid and electrical devices, said base having outside each of said outer pair of walls of the outer rail an attachment section to which said cover is attached;

said cover being bi-laterally symmetrical and being partitioned into a right and left sidewall, said right and left sidewalls having first and second engagement sections that are detachably engaged from a direction of a side of the base with the attachment section of said base and the outer pail of walls of the outer rail, respectively, each of said right and left sidewalls having a locking section at the top end thereof, and having a roof attached to the right and left sidewalls by said locking section so as to extend thereacross, said locking section being released from said roof by pressing and bending the top end of the side wall inwardly.

11. A conduit according to claim 10 wherein said inner rail includes at a top end of each of said walls an edge that extends outward in a direction of a width of the base and conforms to the DIN standard.

* * * * *